Patented July 11, 1950

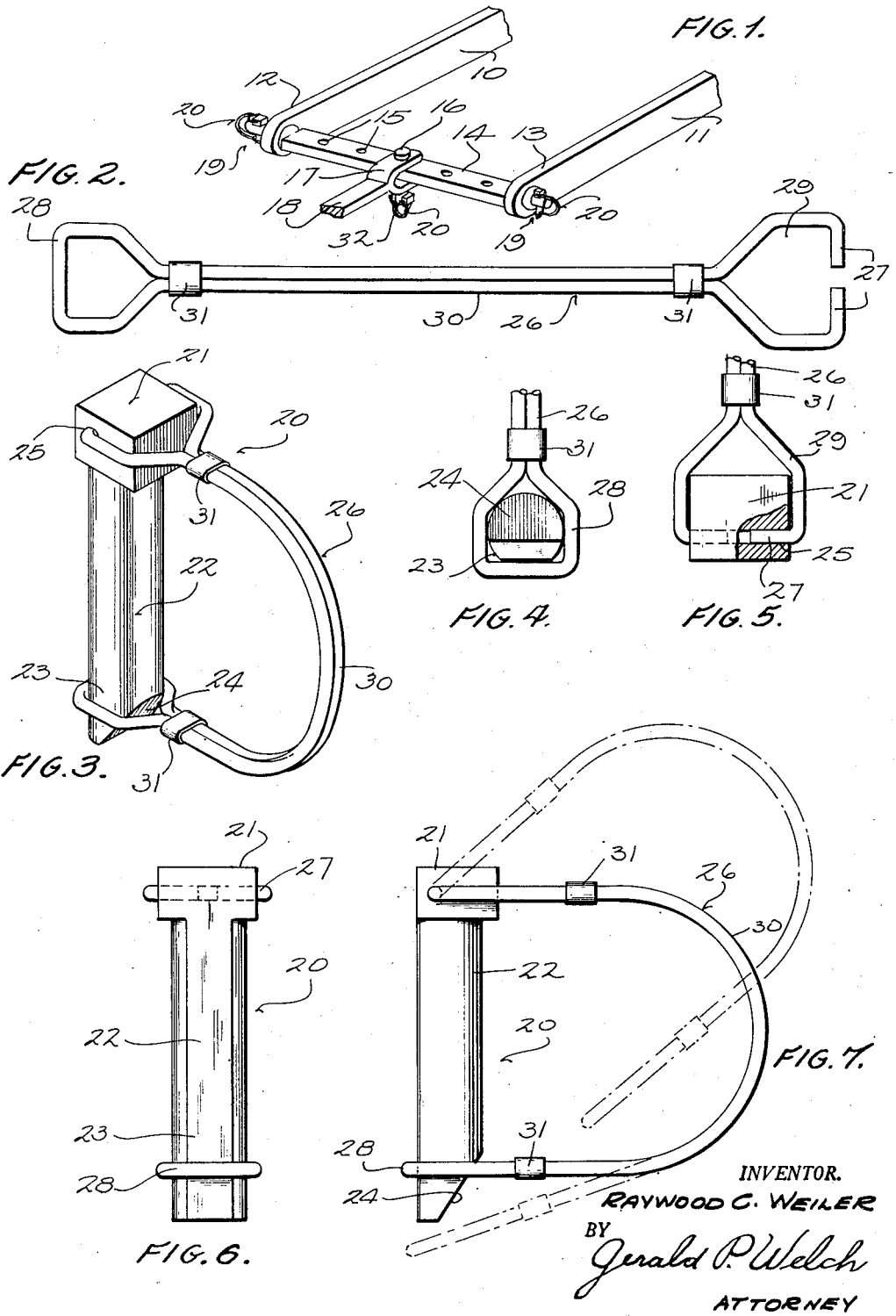

2,514,594

UNITED STATES PATENT OFFICE 2,514,594

DRAWBAR PIN FASTENER

Raywood C. Weiler, Whitewater, Wis.

Application January 5, 1948, Serial No. 608

2 Claims. (Cl. 280—33.15)

This invention relates to improvements in draw bar pin fasteners for tractors and the like, and more particularly to a novel fastener of the pin and yoke type.

An object of the invention is to provide a device of the type which may quickly be attached to secure a draw bar pin, but which cannot be accidentally dislodged in ordinary use.

Another object of the invention is to provide a device of the type having a minimum of parts and great economy of manufacture.

Another object of the invention is to provide a device of the type including a securing yoke form of rod material appropriately bent to shape.

Other and further objects of the invention will appear as the description proceeds, reference being had to the accompanying drawings, in which:

Fig. 1 is a view in perspective showing a draw bar assembly secured by pin fasteners embodying my invention.

Fig. 2 is a plan view of the yoke fastening, before the same is bent to final shape.

Fig. 3 is a view in perspective of a draw bar pin fastener embodying my invention.

Fig. 4 is a fragmentary front end view of the same.

Fig. 5 is a fragmentary and partially cut away rear end view thereof.

Fig. 6 is an inverted plan view of the same.

Fig. 7 is a side view in elevation of the device showing the fastening yoke indicated in broken lines in the open position.

Referring more particularly to the drawings, the numerals 10 and 11 refer to a pair of shafts extending rearwardly from a draft means, such as a tractor. The rear ends thereof, 12 and 13 are connected by a draw-bar 14 having a plurality of apertures, as at 15, for the retention of the draw-bar pin 16 securing the clevis 17 of the tool shank 18.

The draw-bar pin 14 has an aperture adjacent each end thereof as at 19 for the reception of the securing pin or fastener 20.

The fastener 20 comprises a rectangular head 21, an integral body portion 22, having at its opposite end 23, the bevel at 24. The head 21 is bored as at 25 to receive the opposed ends 27 of the yoke member 26, which latter is formed of a rod bent double and formed with an eye 28 at one end thereof and broken eye 29 in the opposite end terminating in the opposed ends 27. The doubled portion 30 between the said eyes has an arcuate form. A pair of clamps 31 maintain mutual contact of the arcuate rod portions 30 of the yoke 26.

The draw-bar pin 16 has an opening therethrough as at 32, and may be held in place in the aperture at 15 of draw-bar 14 and in the clevis 17 by means of one of the fasteners 20.

In use, the fastener 20 is opened by pulling the eye 28 free of the end 23 of the body 22 of said fastener.

The end 23 is then inserted into the aperture at 19 of bar 14 or the aperture 32 of pin 16, after which the eye is slid down the bevel at 24 over the end 23. The rod portions 30 have a high tensile strength and in this position the eye 28 is difficult to remove thus providing an extremely secure fastening means.

It will be understood that the device is capable of many modifications in structure and design without departing from the spirit of the invention within the scope of the appended claims.

Having thus described my invention, what I claim and desire to secure by Letters Patent of the United States, is:

1. A device of the character described comprising a rounded elongate body portion, a rectangular enlarged head at one end thereof as a stop having a bore therethrough, a rod member bent double in arcuate form and bent to form an eye at one end thereof and opposed ends at the other engaged with a pivoting fit in said bore, said eye adapted to snap over and be retained by the free end of said body portion.

2. A device of the character described comprising a rounded elongated body portion, a rectangular head at one end thereof having a bore therethrough, a rod member bent double to form an arc centrally with straight end portions, one end portion formed as an eye, the opposed end portion formed as a yoke journaled in said bore, the free end of the body portion beveled on the side facing the eye to facilitate snapping the same thereover, and strap members engaged about the doubled rod adjacent the eye and the yoke to reinforce the same.

RAYWOOD C. WEILER.

REFERENCES CITED

The following references are of record in the file of this patent:

UNITED STATES PATENTS

| Number | Name | Date |
|---|---|---|
| 2,423,799 | Shelstad | July 8, 1947 |